United States Patent [19]

Philipp et al.

[11] 4,386,240
[45] May 31, 1983

[54] PUSH-BUTTON UNIT FOR TELEPHONE SETS

[75] Inventors: Gerd Philipp; Manfred Ramsaier, both of Stuttgart; Albert Schach, Magstadt, all of Fed. Rep. of Germany

[73] Assignee: International Standard Electric Corporation, New York, N.Y.

[21] Appl. No.: 214,409

[22] Filed: Dec. 8, 1980

[30] Foreign Application Priority Data

Dec. 15, 1979 [DE] Fed. Rep. of Germany ....... 2950665

[51] Int. Cl.³ .................... H01H 13/16; H01H 63/16; H01H 13/70
[52] U.S. Cl. ............................. 179/90 K; 179/158 R; 179/178; 200/5 R; 340/365 S
[58] Field of Search ................ 179/90 K, 158 R, 178; 200/5 A, 5 R, 159 A, 340; 340/365 S

[56] References Cited

U.S. PATENT DOCUMENTS

| 3,445,610 | 5/1969 | Lind | 179/90 K X |
| 3,870,840 | 3/1975 | Rivetta et al. | 179/90 K X |
| 3,919,505 | 11/1975 | Becker et al. | 200/5 R |

FOREIGN PATENT DOCUMENTS 2658706  6/1978  Fed. Rep. of Germany .

*Primary Examiner*—Stafford D. Schreyer
*Attorney, Agent, or Firm*—John T. O'Halloran; Jeffrey P. Morris

[57] ABSTRACT

The buttons of the push-button unit disclosed are guided in the cover and provided with restoring springs. The contact springs of a row are cut free from a strip and pretensioned against the printed-circuit board lying under the strip. In the normal position, they are pulled against the cover by the button shafts. Located below the printed-circuit board is a slide which is actuated by all buttons and acts on the common contact.

9 Claims, 1 Drawing Figure

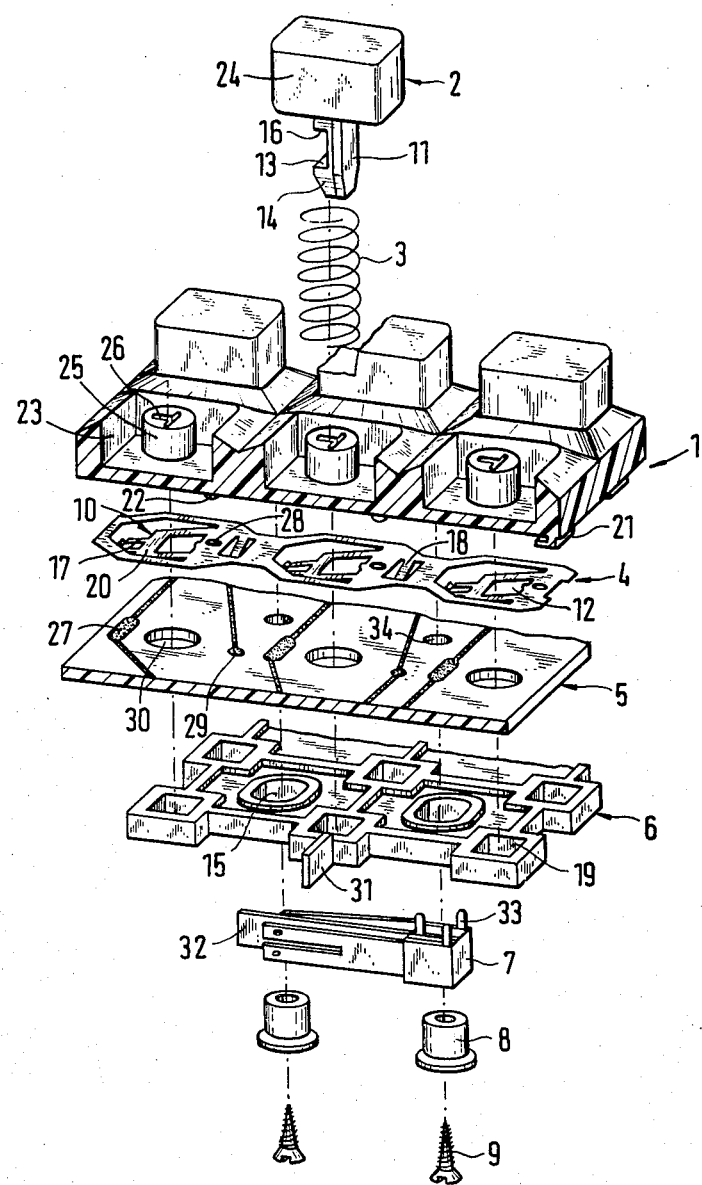

PUSH-BUTTON UNIT FOR TELEPHONE SETS

FIELD OF THE INVENTION

The present invention relates to a push-button unit for telephone sets with buttons arranged in rows and columns and each provided with a restoring spring and guided in a cover which act as contact springs fitted between the cover and a printed-circuit board containing the coding contacts.

BACKGROUND OF THE INVENTION

A push-button unit of this kind is disclosed in DE-OS No. 26 58 706. The round shafts of the buttons of this push-button unit are guided in tubular projections of the cover. The ends of the shafts are slotted and provided with locking noses, so that the buttons are undetachable after insertion. Below each button, a helical spring for restoring the buttons to normal is slipped over the projections of the cover. Resting against the underside of the cover is a spring plate from which all contact springs of the push-button unit are cut free. The contact springs are pretensioned against a printed-circuit board mounted at a short distance from the spring plate. In the normal position, however, the contact springs are kept away from the conductive pattern of the circuit board by means of an insulating member provided at each button shaft. Located below the printed-circuit board is a flat box which contains hinged flaps capable of being actuated by the buttons, a slide, and a microswitch serving as a common contact. The flaps deflect the movements of the buttons at right angles and transmit the movement to the slide, which, in turn, actuates the microswitch. The push-button unit thus belongs in that category of mechanical units in which the coding contact elements are individually associated with each button. Electrical connection is made directly upon depression of a button.

The object of the invention is to provide a push-button unit of this kind which is particularly flat and simple in construction. On the other hand, the push-button unit is to be codable for different signalling systems, namely d.c. code C, multi-frequency, and loop-disconnect, and exchangeable for push-button units of another kind. This object is achieved by the features set forth in the characterizing part of claim 1. Preferred embodiments are apparent from the subclaims. The construction according to the invention fulfills the requirements to be met in an advantageous manner. The contact-spring strips permit manufacture involving little waste. The assembly of the push-button unit can be carried out with effortless ease or fully mechanized. The ease of changeability of the printed-circuit board and the small height of construction make the push-button unit suitable for many applications.

BRIEF DESCRIPTION OF THE DRAWING

An embodiment of the invention will now be described with reference to the accompanying drawing. The single FIGURE shows a cross section through the push-button unit in an exploded view.

DESCRIPTION OF THE PREFERRED EMBODIMENT

The cover 1 is a plastic moulding and provides guides and support for the buttons 2. The latter are arranged, as usual, in four rows and three columns. If additional buttons are necessary, the number of columns can readily be increased to four if the cover is made correspondingly larger. Disposed below the cover 1 are the contact springs 10, which form integral parts of strips each extending over one row.

The opposite contacts 27 to the contact springs lie on the printed-circuit board 5, which follows the contact-spring strip downward. Located below the printed circuit board 5 is the slide 6, which is freely supported by the collar bushings 8 and can be moved by all buttons. The collar bushings are traversed by screws 9, with which they are fastened to the cover 1. A projection 31 of the slide acts on the contact-spring set 7 serving as a common contact, which is attached to the printed-circuit board.

For receiving the knobs 24 of the buttons 2 when the latter are operated, the cover 1 is provided with corresponding depressions 23 on its upper side. Located at the center of each depression is a cylindrical guide member 25 having a T-shaped opening 26, in which slides the button shaft 11, which is also of T-shaped section. Slipped over the guide member 25 is a helical compression spring 3, whose other end is fitted in the hollow knob 24. The spring 3 serves to return the button 2 to the neutral position. In the central member of the T-shaped button shaft 11, a rectangular recess is made at right angles to the shaft axis to form two opposite actuating noses 13 and 16, whose function will be described later.

Moulded to the underside of the cover 1 are one relieved projection 21 per row and two small pins 22, which serve to hold the contact-spring strip 4 in place. The projection 21 is located near one outer edge of the cover 1, and the pins 22 are spaced roughly the width of a column from the projection 21 and from each other, respectively.

This strip 4 comprises the contact springs 10 of one row, i.e., normally three. Accordingly, four such strips are necessary for one push-button unit. The contact springs 10 are cut free from the strip 4. The horizontal section of each of the springs 10 is that of a rectangular frame one side of which is connected with or formed by the strip body, i.e., the rectangular contact spring 10 is cut free from the strip 4 on three sides, and a like-wise rectangular opening 12 is punched in the rectangle. Moulded to the cross portion 20 forming the free end of the frame 10 is a slotted contact blade 17 which permits double contact to be made with the printed circuit board 5. All contact springs of a strip point in the same direction and are pretensioned against the printed-circuit board by being bent out of the strip plane.

In addition, short contact blades 18 are cut free from the strip 4 between the contact springs 10. They are directed at right angles to the longitudinal axis of the strip and also pretensioned against the printed-circuit board 5. Beside these contact blades are the holes 28 for the pin 22 of the cover. The strips 4 can be produced economically from spring strip in a single operation.

The contact blades 18 of the strips 4 are in permanent contact with the conductors 29 of the printed-circuit board 5 because the row is thus supplied with current. The other conductors 27 are widened at those points where the contact springs 10 come into contact with them when buttons are operated. Finally, the board has relatively large holes 30 for the button shafts 11, and small holes 34 for the screws 9.

Located below the printed-circuit board 5 is the slide 6, which is a plastic moulding having rectangular openings 19 arranged in the grid formed by the rows and columns. When the buttons are operated, their shafts 11 act with their bevelled ends 14 on these openings 19 and enter them. The resulting displacement of the slide 6 causes the leaf springs 32 of the contact-spring set 7 to be actuated via a lateral projection 31 of the slide 6. Between the rectangular openings 19 of the slide are oblong holes 15 for inserting the collar bushings 8. Since the necks of the latter are slightly longer than the thickness of the slide, the movability of the slide is ensured.

For the self-tapping countersunk screws 9, sockets (not visible) are provided in the cover 1.

The contact-spring set 7 is attached to the underside of the printed-circuit board 5 by means of the soldering lugs 33 of the individual leaf springs 32; these lugs 33 are inserted into corresponding soldering eyelets and soldered to the conductors.

The push-button unit is assembled as follows: All buttons 2 are inserted into the cover, with the restoring springs 3 fitted therebetween. Then the strips 4 with the row-contact springs 10 are placed on the underside, which has been turned upward. The button shafts 11 pass through the cutouts 12 and snap with their actuating noses 13 behind the cross portions 20 of the contact springs 10. As the restoring springs 3 are stronger than the contact springs 10, the latter are placed against the cover 1. Buttons 2 and row strips 4 thus hold each other in place, and the cover having the buttons 2 inserted therein forms a separate subassembly which is always the same irrespective of the signalling system for which the push-button block is to be used. This is not decided until an appropriate printed-circuit board 5 is fitted on. The printed-circuit board with the contact-spring set 7 and the slide 6 are placed on the push-button set, which has been turned over. The collar bushings 8 are inserted, and the screws 9 are tightened.

As to the operation of the push-button unit, it should be added that, when a button 2 is operated, the corresponding contact spring 10, following its pretension, makes contact with the conductor 27. When the button is released, the actuating nose 13 pulls the contact spring 10 against the cover 1 again, and the contact is broken. When a button is operated, the slide 6, as mentioned earlier, is moved by the bevelled shaft end 14 in the column direction against the contact-spring set 7, so that the latter is switched over. The return of the slide upon release of the button is effected by the leaf spring 32 of the contact-spring set, which spring cooperates with the projection 31 of the slide.

We claim:

1. Push-button unit for telephone sets with buttons arranged in rows and columns and each provided with a restoring spring and guided in a cover, which act on contact springs fitted between the cover and a printed-circuit board containing coding contacts, and on a slide movable below the printed circuit board transversely to the direction of travel of the buttons and designed to actuate a common contact for all buttons, wherein the contact springs of a row are integral parts of a strip which is secured in position between the cover and the printed-circuit board, and each of whose contact springs has a cutout through which extends a shaft of a respective button and whose edge is acted upon by actuating noses of the shaft, said shaft having a bevelled end, entering a corresponding opening in the slide which is supported by collar bushings fastened to the cover and resting against the printed circuit board, which moves the slide when the button is operated.

2. A push-button unit as claimed in claim 1, wherein the contact spring is cut free from the strip and, because of the cutout, has a frame-like horizontal section, one side being connected with the strip area, and the opposite cross portion being provided with a slotted contact blade forming an integral part thereof.

3. A push-button unit as claimed in claim 2, wherein the strip is secured in position by a relieved projection at a narrow side of the cover facing away from the contact blades, and by pins of the cover passing through corresponding holes in the strip.

4. A push-button unit as claimed in claim 3, wherein between adjacent contact springs, a short contact blade extending at right angles to the contact springs is cut free from the strip.

5. A push-button unit as claimed in claim 4, wherein the contact springs and the short contact blades of the strip are pretensioned against the printed-circuit board.

6. A push-button unit as claimed in claim 1, wherein the button shaft is of T-shaped section, and that the actuating noses are formed by making a rectangular recess in the central leg.

7. A push-button unit as claimed in claim 1, wherein the cover is provided with depressions corresponding to the volumetric dimension of the knobs and each containing a central cylindrical guide member having the restoring spring fitted thereon and the button shaft inserted therein.

8. A push-button unit as claimed in claim 1, wherein the slide is provided with oblong holes which determine its direction and quantity of motion and are penetrated by the collar bushings.

9. A push-button unit as claimed in claim 1, wherein the common contact for the spring set is soldered into the printed-circuit board from the underside and provides the restoring force for the slide.

* * * * *